(12) United States Patent
Fukuda

(10) Patent No.: US 11,330,082 B2
(45) Date of Patent: May 10, 2022

(54) INFORMATION PROCESSING SYSTEM, SERVICE PROVIDING SYSTEM, AND USER CREATION METHOD

(71) Applicant: Yasuharu Fukuda, Kanagawa (JP)

(72) Inventor: Yasuharu Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/193,297

(22) Filed: Mar. 5, 2021

(65) Prior Publication Data
US 2021/0297507 A1 Sep. 23, 2021

(30) Foreign Application Priority Data
Mar. 18, 2020 (JP) .............................. JP2020-048477

(51) Int. Cl.
| | |
|---|---|
| *H04L 67/01* | (2022.01) |
| *H04L 67/306* | (2022.01) |
| *H04L 67/63* | (2022.01) |
| *H04L 67/00* | (2022.01) |

(52) U.S. Cl.
CPC ............ *H04L 67/42* (2013.01); *H04L 67/306* (2013.01); *H04L 67/327* (2013.01); *H04L 67/34* (2013.01)

(58) Field of Classification Search
CPC ..... H04L 67/42; H04L 67/306; H04L 67/327; H04L 67/34
USPC ........................................................ 709/203
See application file for complete search history.

(56) References Cited

U.S. PATENT DOCUMENTS

| | | | | |
|---|---|---|---|---|
| 8,291,490 | B1 * | 10/2012 | Ahmed ................. | G06F 21/604 726/17 |
| 2012/0192257 | A1 * | 7/2012 | Ishii ..................... | H04N 1/4433 726/7 |
| 2013/0198211 | A1 | 8/2013 | Kohkaki et al. | |
| 2014/0123239 | A1 | 5/2014 | Fukuda et al. | |
| 2014/0123240 | A1 | 5/2014 | Seo et al. | |
| 2014/0223535 | A1 | 8/2014 | Fukuda et al. | |
| 2015/0200926 | A1 | 7/2015 | Fukuda | |
| 2015/0264039 | A1 | 9/2015 | Fukuda | |
| 2015/0269390 | A1 * | 9/2015 | Schaefer ............. | G06F 21/6218 707/781 |
| 2016/0125173 | A1 | 5/2016 | Ohzaki et al. | |
| 2016/0125177 | A1 | 5/2016 | Kashiyama et al. | |
| 2016/0127349 | A1 | 5/2016 | Nakajima et al. | |
| 2016/0127356 | A1 | 5/2016 | Fukuda et al. | |
| 2016/0337365 | A1 * | 11/2016 | Beiter .................. | H04L 63/102 |

(Continued)

FOREIGN PATENT DOCUMENTS

| | | |
|---|---|---|
| CN | 105653849 B * | 9/2018 |
| JP | 2013-033449 | 2/2013 |
| JP | 2018-156128 | 10/2018 |

OTHER PUBLICATIONS

Extended European Search Report for 21160303.0 dated Jul. 5, 2021.

*Primary Examiner* — Chris Parry
*Assistant Examiner* — Weiwei Y Stiltner
(74) *Attorney, Agent, or Firm* — IPUSA, PLLC

(57) ABSTRACT

An information processing system, a service providing system, and a user creation method. The information processing system creates a second user belonging to a second tenant in response to reception of a request for managing the second tenant from a terminal device operated by a first user, the second tenant being different from a first tenant to which the first user belongs.

9 Claims, 14 Drawing Sheets

(56) References Cited

U.S. PATENT DOCUMENTS

| | | |
|---|---|---|
| 2017/0041504 A1 | 2/2017 | Fukuda |
| 2017/0054684 A1 | 2/2017 | Ohzaki et al. |
| 2017/0063871 A1 | 3/2017 | Kashiyama et al. |
| 2017/0149788 A1 | 5/2017 | Ohzaki et al. |
| 2018/0121646 A1 | 5/2018 | Sakanashi et al. |
| 2018/0268124 A1 | 9/2018 | Ohzaki et al. |
| 2018/0270246 A1 | 9/2018 | Fukuda et al. |
| 2020/0358617 A1* | 11/2020 | Baierlein ............ H04L 63/0807 |

* cited by examiner

FIG. 6A

| TENANT ID | TENANT NAME | PARENT TENANT | PROXY REQUEST |
|---|---|---|---|
| Parent A | Company A | – | – |
| Parent B | Company B | – | – |
| tenant A | Shop C | Parent A | YES |
| tenant B | Bank D | Parent B | NO |
| ... | ... | ... | ... |

FIG. 6B

| TENANT ID | USER ID | ROLE | VIRTUAL USER |
|---|---|---|---|
| Parent A | r_admin001 | Admin | NO |
| Parent A | r_user001 | User | NO |
| Parent B | rj_admin001 | Admin | NO |
| Parent B | rj_user001 | User | NO |
| tenant A | a_virtual_001 | Admin | YES |
| tenant B | b_virtual_001 | Admin | YES |
| ... | ... | ... | ... |

FIG. 6C

| SESSION ID | USER ID |
|---|---|
| aaaaaaaa | r_admin001 |
| bbbbbbbb | r_user001 |
| cccccccc | rj_admin001 |
| dddddddd | a_virtual_001 |
| ... | ... |

FIG. 6D

| TENANT ID | PRINT SETTINGS | EXTERNAL STORAGE |
|---|---|---|
| tenant A | COLOR | Box |
| tenant B | MONOCHROME | Sharepoint |
| | | |
| | | |

FIG. 6E

| SESSION KEY | SESSION ID |
|---|---|
| rsi | aaaaaaaa |
| rsi-admin | bbbbbbbb |
| | |
| | |
| | |

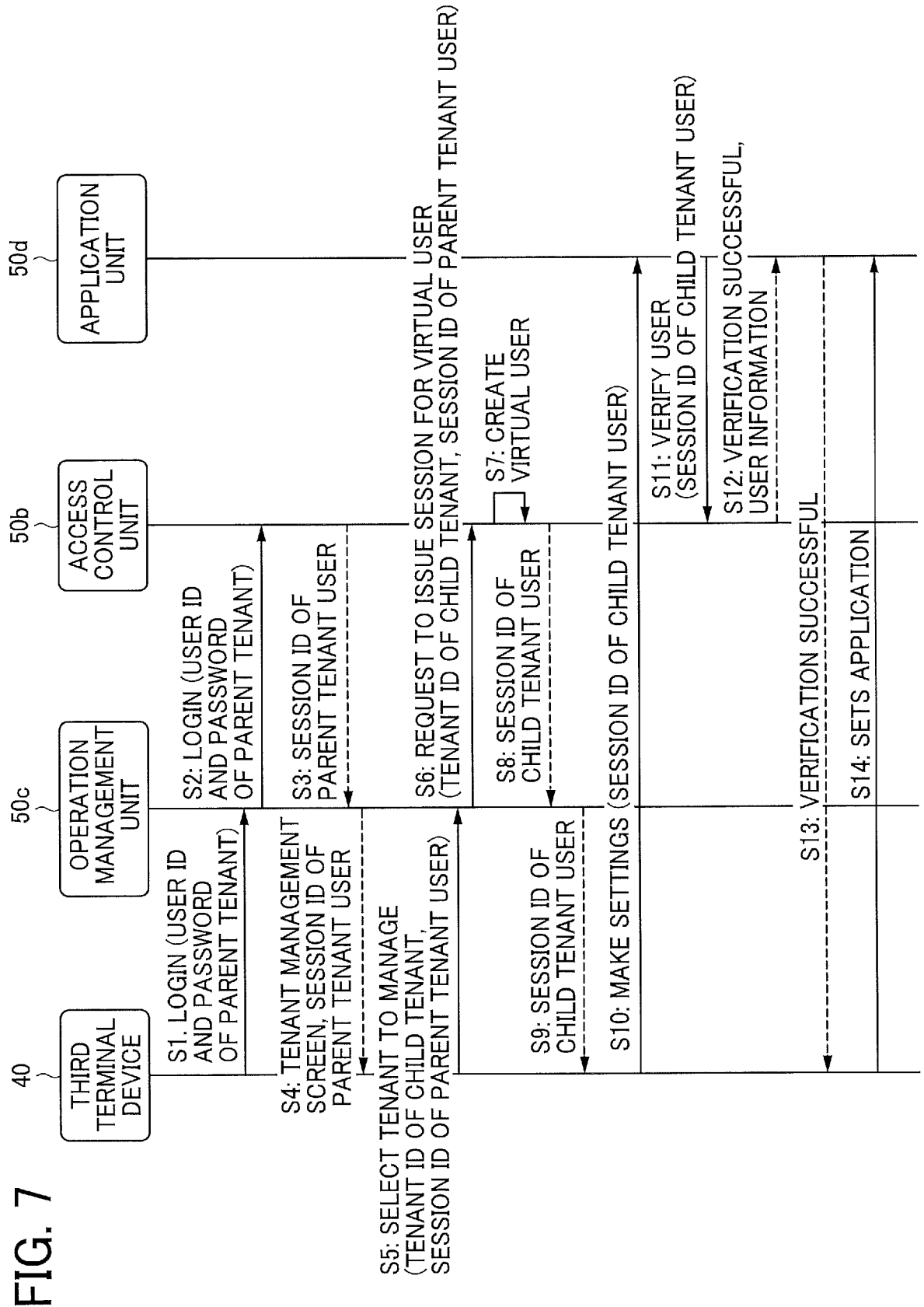

FIG. 8

Sample

Account

Input login information.

Tenant ID — 304

User ID — 301

Password — 302

Login — 303

Forgot password?

Privacy policy
License

INFORMATION PROCESSING SYSTEM, SERVICE PROVIDING SYSTEM, AND USER CREATION METHOD

CROSS-REFERENCE TO RELATED APPLICATIONS

This patent application is based on and claims priority pursuant to 35 U.S.C. § 119(a) to Japanese Patent Application No. 2020-048477, filed on Mar. 18, 2020, in the Japan Patent Office, the entire disclosure of which is hereby incorporated by reference herein.

BACKGROUND

Technical Field

The present disclosure relates to an information processing system, a service providing system, and a user creation method.

Related Art

Information processing systems that provide services using applications to users through a network are known. By preparing a certain environment such as a terminal device or an electronic device such as a personal computer (PC) and a web browser that operates on the terminal device or the electronic device, the users can use the services provided by a web application on the information processing system with the terminal device or the electronic device.

In some cases, a company, or the like contracts a service provided by such an information processing system as an organization, and a member of the organization or the like uses the service as a user. Organizations that have contracted services are managed in a unit called tenant. In order for a user (employee of a company or the like) to use the service, the user needs to be registered in the tenant. For example, a tenant manager may register the user in the tenant.

As a result, a plurality of tenants can receive various services from the information processing system according to a contract. Such a system is called a multi-tenant system. Although each tenant is basically independent, a technique has been devised in which a manager who manages one tenant manages the other.

SUMMARY

Embodiments of the present disclosure describe an information processing system, a service providing system, and a user creation method. The information processing system creates a second user belonging to a second tenant in response to reception of a request for managing the second tenant from a terminal device operated by a first user, the second tenant being different from a first tenant to which the first user belong.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 6A, 6B, 6C, 6D, and 6E are diagrams respectively illustrating examples of information held by a tenant data storage unit, a user data storage unit, a session data storage unit, an application data storage unit, and a web browser;

FIG. 7 is a sequence diagram illustrating an example of a login of operator, a creation of virtual user, and a process of setting an application or the like;

FIG. 8 is a diagram illustrating an example of a login screen displayed by the third terminal device;

Figure 1A:
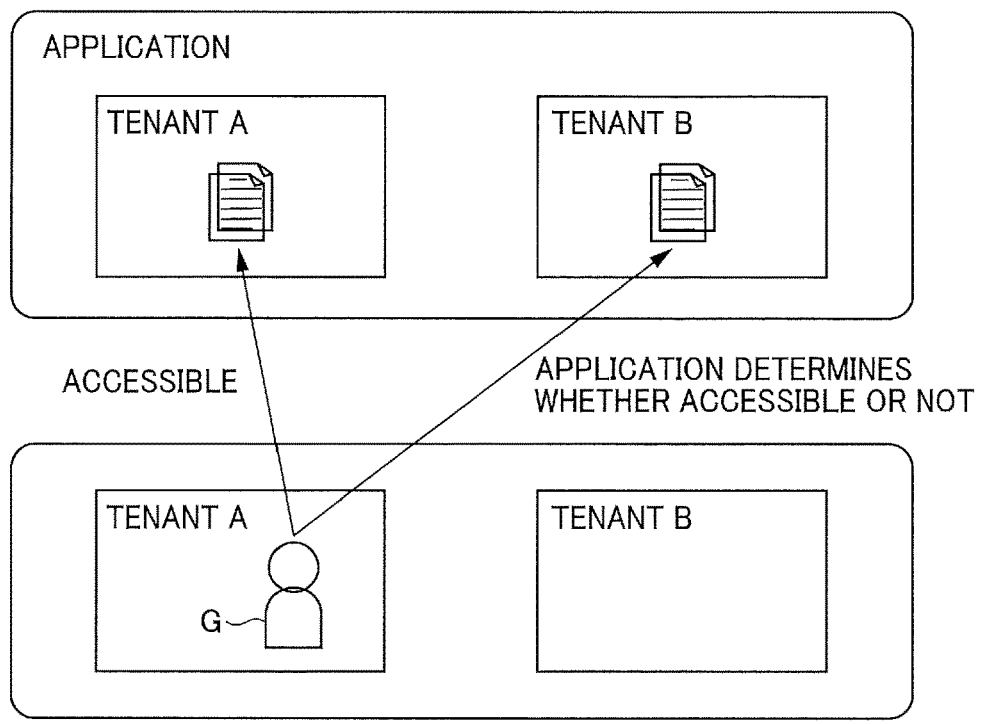
FIGS. 1A and 1B are diagrams illustrating a usage method in which a user uses an application across tenants.

The accompanying drawings are intended to depict embodiments of the present invention and should not be interpreted to limit the scope thereof. The accompanying drawings are not to be considered as drawn to scale unless explicitly noted. Also, identical, or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, as an example of embodiments for carrying out the present disclosure, a service providing system and a user creation method performed by the service providing system is described.

In explaining the present embodiment, a reference comparative example is described below. Note that the comparative example is not limited to a prior art and publicly known techniques.

Figure 1B:
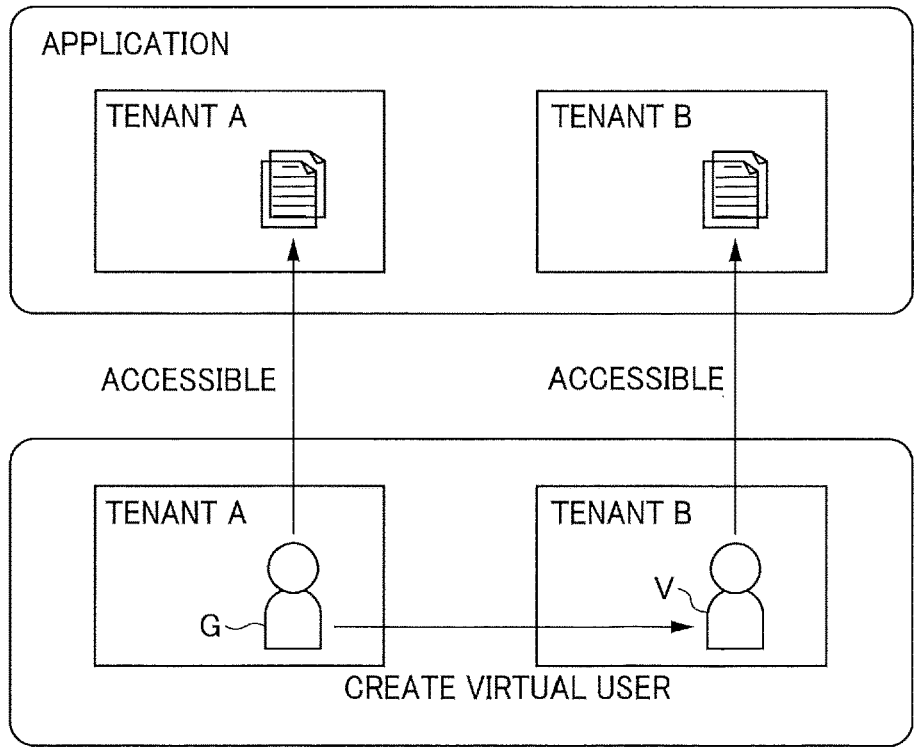

FIGS. 1A and 1B are diagrams illustrating a usage method in which a user uses an application across tenants. FIG. 1A illustrates a comparative example, and FIG. 1B illustrates a usage method of the present embodiment. An example of a situation in which the user uses the application across tenants is described. Across tenants indicates that in between independent tenants, the user of one tenant accesses the other tenant.

For example, tenant A is a tenant to which an operator G (an example of a first user) who provides a service to a customer belongs, and tenant B is a tenant to which a user of a general customer belongs. The tenant B has a tenant manager, but if the operator G of tenant A can manage the tenant B (settings related to applications, etc.), the burden on the tenant manager of tenant B will be reduced. Therefore, it is convenient if the operator G of the tenant A can access the tenant B with the same authority as the tenant manager of the tenant B. Management performed by the operator G on behalf of the tenant manager includes tenant creation, initial settings, application settings, and the like. As described above, the operator G performing the settings and the like on behalf of the tenant manager is called a proxy.

The comparative example is described below. The operator G belongs to the tenant A and can log in to application of the tenant A, but does not have the authority to log in to application of the tenant B. Therefore, in order for the operator G to use the application that can be used by the tenant B, as described above, the access control between the tenants is used by utilizing the fact that the tenant A is superior to the tenant B. Furthermore, the application that can be used by the tenant B must also have a function or mechanism that can be used by other tenant A users.

A method of using the application across tenants in the present embodiment is described. In the present embodiment, if the operator G who has logged in to the tenant A has the authority, the information processing system creates a virtual user V in the tenant B who can manage the tenant B (the application can also be used). Since the virtual user V (an example of a second user) is registered as a user of the tenant B, the virtual user V can use the application available in the tenant B.

In such a method, the access control between tenants is not required, and the application only needs to be allowed to access from the same tenant (tenant B in this case) as before. When the operator G operates the application of tenant B, the operator G is logged in as a user of tenant B, so even if the access control between tenants and the application do not support the use by users of other tenants the application can be operated across tenants.

Although in FIGS. 1A and 1B, the tenant A is described as the tenant to which the operator G belongs, the tenant A may be able to create the virtual user even if the tenant is a tenant to which a general customer belongs.

A tenant is information indicating a customer who shares the same software with one or more customers among a plurality of customers, for example, a company which is a group of customers. Companies, etc. become tenants by contracting with service providers regarding the provision of services.

Tenant manager is one of roles of users who belong to the tenant. For example, a system administrator in the company may also serve as the tenant manager. The tenant manager can register the users who belong to the tenant and can make various settings such as assigning application usage authorization to each user.

A role is a function within the tenant. The authority is granted according to the role. For example, the tenant manager decides each role by considering the user's job category, position, and usage of the application.

An application program is a program executed by a terminal device and the information processing system in order for a user to receive a service. A program executed by the terminal device and an information processing apparatus in cooperation is also called a web application. The application may be, for example, a workflow application that executes a series of processes in order. The application can be built by the tenant manager or the like by combining components. For example, an application that uploads and saves a document read by an electronic device 10 to a storage on the cloud may be constructed by combining a document reading component, a document transmitting component, and the like. In this embodiment, the application program may be simply referred to as an application.

An operator is a user in the service provider, who sells the service providing system to the tenant, or who manages service after sale. The operator may be called a sales person or a dealer.

Figure 2:
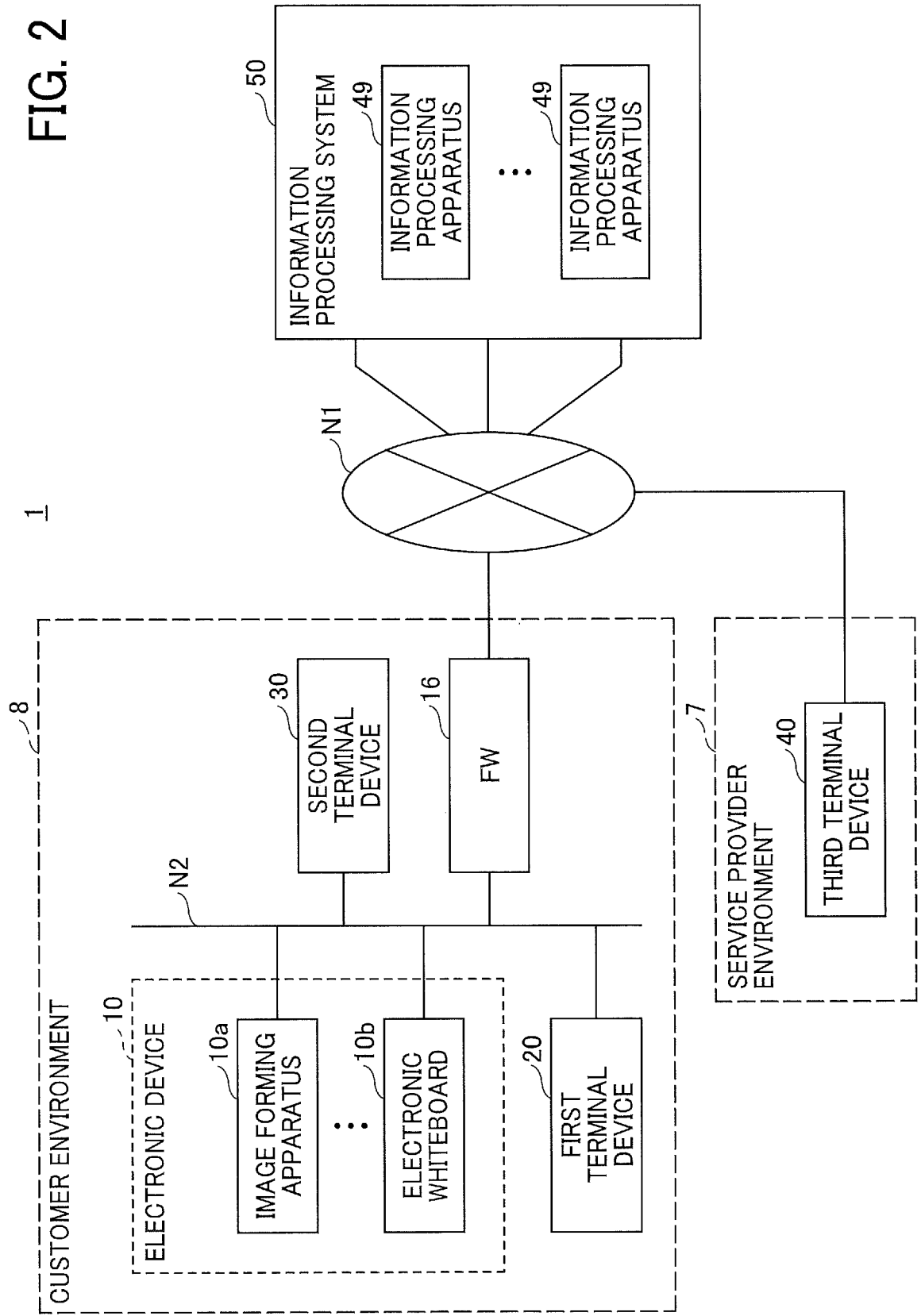
FIG. 2 is a block diagram illustrating an example of a configuration of a service providing system according to embodiments of the present disclosure.

FIG. 2 is a block diagram illustrating an example of a configuration of a service providing system 1 according to the present embodiment. In the service providing system 1 of FIG. 2, the customer environment 8 and the service provider environment 7 are connected to the information processing system 50 via a network N1 such as the internet. The network N1 also includes a telephone network such as a mobile phone network.

A customer is a customer of the service provided by the information processing system 50, and includes an organization such as a company, a group, an educational institution, an administrative organization, or a department. Those who have some kind of employment relationship with the customer may be the users in the tenant. In the customer environment 8, one or more electronic devices 10, a first terminal device 20, a second terminal device 30, and a firewall (FW) 16 are connected via a network N2 such as a local area network (LAN). Further, the information processing system 50 includes one or more information processing apparatuses 49 connected to the network N1. A service provider is a provider of services to the customers. A third terminal device 40 is included in the service provider environment 7.

The electronic device 10 is, for example, an image forming apparatus 10a such as a laser printer, a multifunction printer, a multi-function peripheral/product/printer (MFP), and the like. Further, as the electronic device 10, an electronic whiteboard 10b may also be mentioned. In addition, the electronic device 10 includes, for example, a projector (PJ), an output device such as a digital signage, a head up display (HUD), an industrial machine, an imaging device, a sound collecting device, a medical device, a network home appliance, an automobile (connected car), a notebook computer, a mobile phone, a smartphone, a tablet terminal, a game console, a personal digital assistant (PDA), a digital camera, a wearable personal computer (PC) or a desktop PC.

The electronic device 10 of the present embodiment is a terminal operated by the user registered in the information processing system 50 to use the service. The user logs in to the information processing system 50 from the electronic device 10, selects the application (application program) for which the user has usage authorization to use, and receives the service provided by the information processing system 50. As described above, the service is provided according to the application in use.

The first terminal device 20 is an information processing apparatus such as the smartphone, the mobile phone, the tablet PC, the desktop PC, or the notebook PC used by the tenant manager. The first terminal device 20 is equipped with a program having a screen display function such as a web browser. The program is not limited to a web browser as long as the program includes a function of displaying screen information received from an information processing apparatus as a screen. A program dedicated to the information processing system 50 may be used.

The second terminal device 30 is an information processing apparatus such as the smartphone, the mobile phone, the tablet PC, the desktop PC, or the notebook PC used by the user. The second terminal device 30 is equipped with a program including the screen display function such as the web browser. The program is not limited to the web browser as long as the program includes a function of displaying screen information received from the information processing apparatus as a screen. A program dedicated to the information processing system 50 may be used.

The third terminal device 40 is an information processing apparatus such as the smartphone, the mobile phone, the tablet PC, the desktop PC, or the notebook PC used by the operator G. The third terminal device 40 is equipped with a program having the screen display function such as the web browser. The program is not limited to the web browser as long as the program includes a function of displaying screen information received from the information processing apparatus as a screen. A program dedicated to the information processing system 50 may be used.

The firewall 16 is a device for preventing intrusion from the outside into the customer environment 8, and all communications from the customer environment 8 are monitored by the firewall 16. However, the above description does not apply when the first terminal device 20, the second terminal device 30, or the third terminal device 40 communicates with the information processing system 50 via the telephone network such as the mobile phone network.

The information processing system 50 provides various services to the electronic device 10, the second terminal device 30, and the like. The services vary depending on type of the electronic device 10. In the case of the image forming apparatus 10*a*, the services include uploading and saving a scanned document to the storage on the cloud and downloading and printing image data of the storage on the cloud, but the service are not limited to the service described above. In the case of the electronic whiteboard 10*b*, for example, the services include recognizing voice in real time and creating minutes, converting handwritten data into text, and the like. In the case of the second terminal device 30, for example, the services include a real-time translation service for web pages.

In the information processing system 50, the tenant and the user are associated with each other. The services (applications) that can be used are determined according to the role of the user, and the user uses the application that the user can use from the electronic device or the second terminal device 30. In addition, the tenants, the tenant managers, and the users have following relationships. One customer/One tenant (The tenant manager and user belong to one tenant.) One customer/Multiple tenants (The tenant managers do not always belong to tenants, but manage each tenant and the users who belong to the tenant. The user belongs to one or more tenants.) In either case, the user registered in the information processing system 50 belongs to one of the tenants. Therefore, if the user is specified after registration, the tenant to which the user belongs is also specified. In the case of one customer/one tenant, if the tenant manager logs in to the tenant, the tenant is automatically determined. (The tenant does not have to be specified.) In the case of one customer/multiple tenants, the tenant manager should specify the tenant at login (or each tenant has a different account).

The information processing system 50 creates screen information of a web page to be displayed on the first terminal device 20, the second terminal device 30, the third terminal device 40, or the electronic device 10, and transmits the screen information to the first terminal device 20, the second terminal device 30, the third terminal device 40, or the electronic device 10. For example, a login screen, a tenant management screen, an application setting screen, etc., which are described below, are displayed.

The screen information is created by Hypertext Markup Language (HTML), Extensible Markup Language (XML), Cascade Style Sheet (CSS), JAVASCRIPT (registered trademark), and the like. The web page may be provided by a web application. A web application refers to software or a mechanism that is executed on a web browser, as a program written in a programming language (for example, JAVASCRIPT (registered trademark)) operates on a web browser in cooperation with a program on the web server. A web page can be dynamically changed by the web application.

The information processing system 50 may be compatible with cloud computing. Cloud computing refers to a usage mode in which resources on a network are used without causing the user to become aware of specific hardware resources. The information processing system 50 that supports cloud computing may be referred to as a cloud system. The cloud system may be on the internet or on-premises.

Further, the configuration of the service providing system 1 illustrated in FIG. 2 is an example, and one or more servers (proxy server, gateway server, etc.) may be interposed between the customer environment and the information processing apparatus. Further, the first terminal device 20 and the second terminal device 30 may be in an environment other than the customer environment, and may be connected to, for example, the network N1. The third terminal device 40 may be in an environment other than the service provider environment, and may be connected to, for example, the network N1.

The information processing system 50 may be implemented by one information processing apparatus 49 or functions of the information processing system 50 may be distributed and implemented by a plurality of information processing apparatuses 49. For example, each service may be provided by one information processing apparatus 49, one information processing apparatus 49 may provide a plurality of services, or a plurality of information processing apparatuses 49 may provide one service.

Further, in the information processing system 50 of FIG. 2, the information processing apparatus is connected to a network N1 such as the internet outside the customer environment. In other words, the information processing system 50 of FIG. 2 is an example in which the information processing system 50 is provided in the cloud environment. However, the information processing system 50 may be provided inside the customer environment (on-premises environment).

Figure 3:
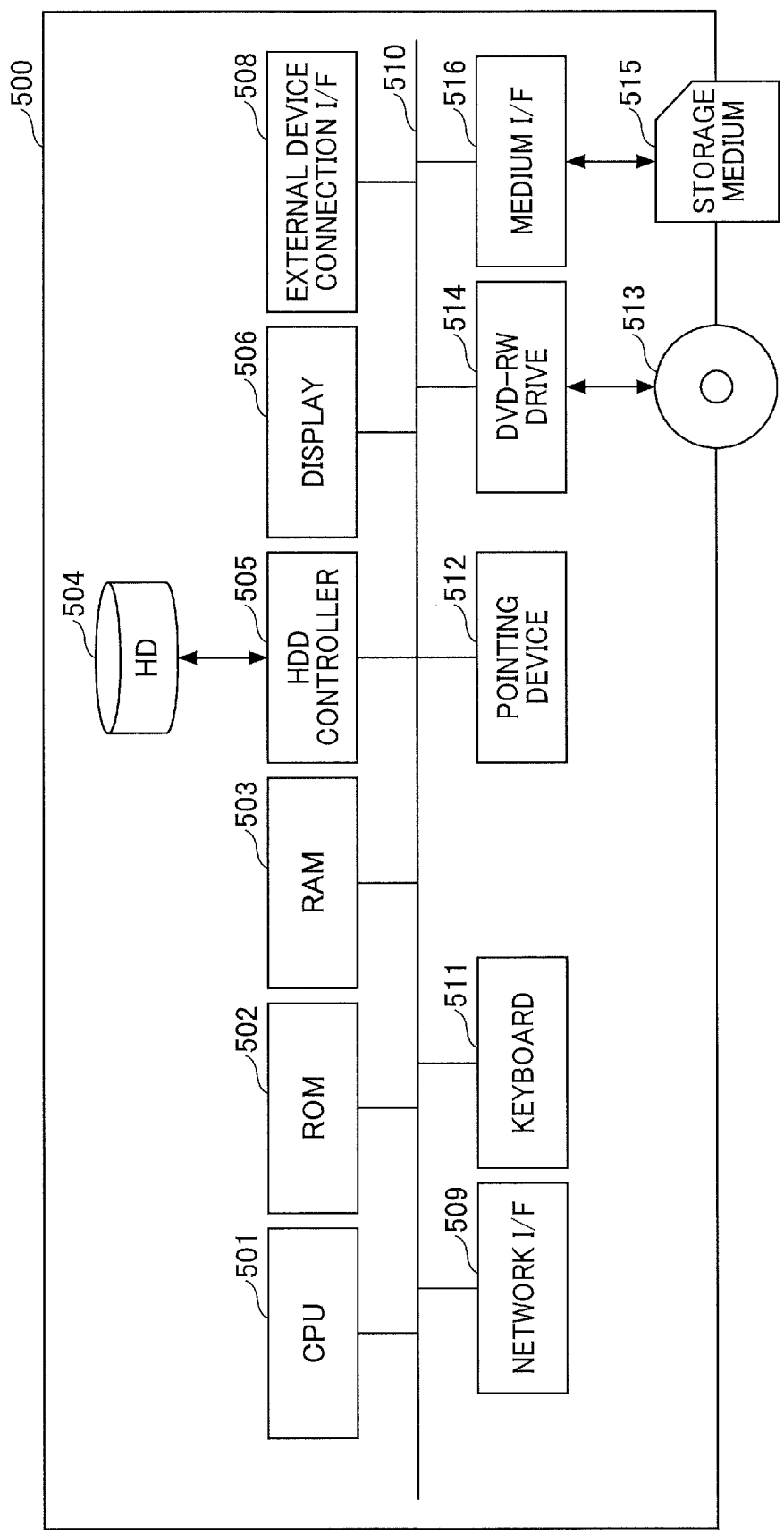
FIG. 3 is a block diagram illustrating a hardware configuration of an example of a computer.

The first terminal device 20, the second terminal device 30, the third terminal device 40, or the information processing system 50 of FIG. 2 is implemented by, for example, a computer having a hardware configuration illustrated in FIG. 3. FIG. 3 is a block diagram illustrating an example of a hardware configuration of the computer. The computer 500 of FIG. 3 is implemented by the computer as illustrated in FIG. 3 including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514 and a medium I/F 516.

Among these elements, the CPU 501 controls entire operation of the computer. The ROM 502 stores a program such as an initial program loader (IPL) used for driving the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a Universal Serial Bus (USB) memory or a printer. The network I/F 509 is an interface that controls data communication performed with an external device through the communication network. The bus line 510 is an address bus, a data bus, or the like for electrically connecting each component such as the CPU 501 illustrated in FIG. 3.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading or writing (storage) of data to a storage medium 515 such as a flash memory.

Figure 4:
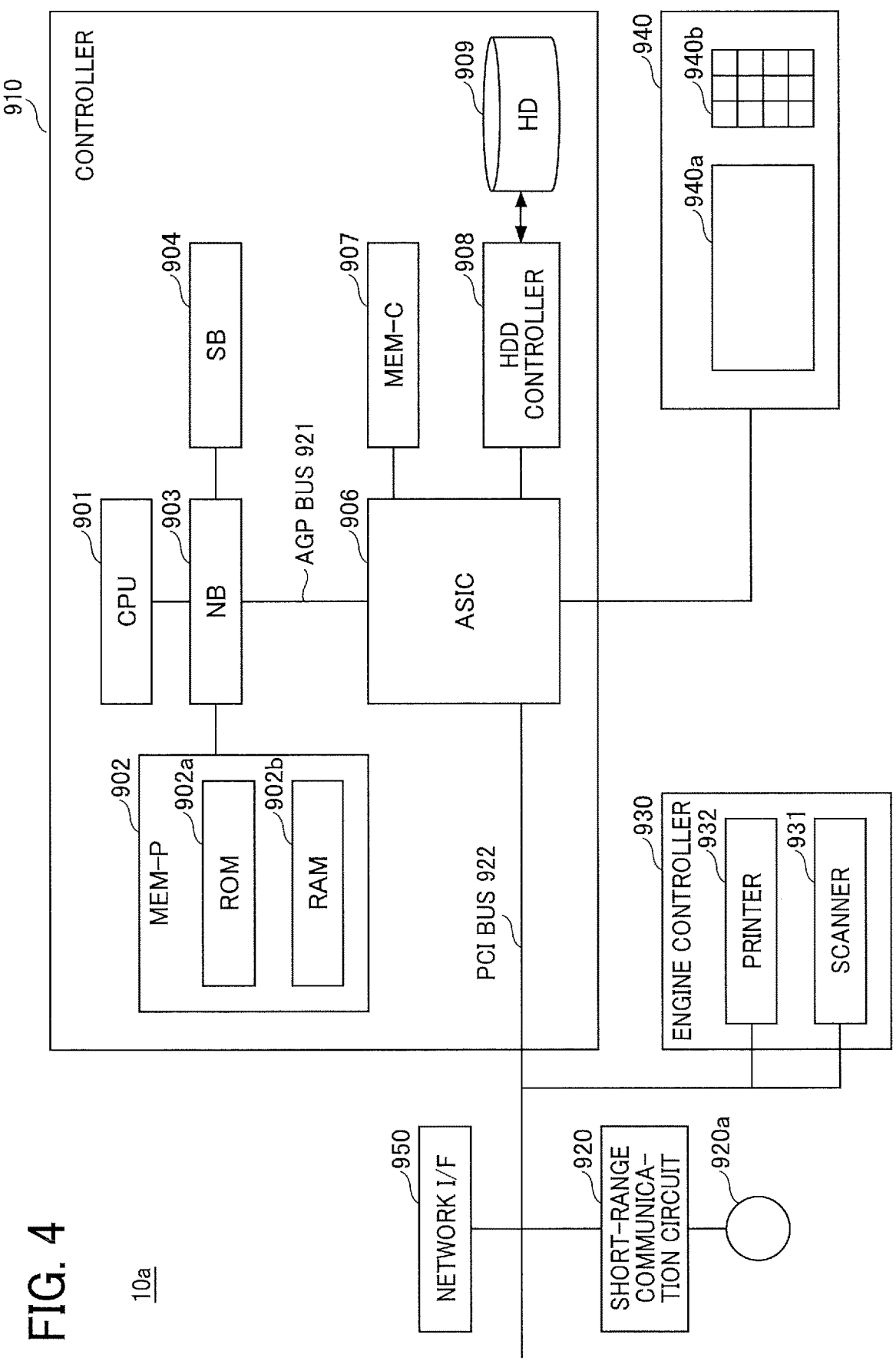
FIG. 4 is a block diagram illustrating a hardware configuration of an example of an image forming apparatus.

FIG. 4 is a block diagram illustrating a hardware configuration of an example of the image forming apparatus 10a. As illustrated in FIG. 4, the image forming apparatus 10a includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the image forming apparatus 10a. The NB 903 connects the CPU 901 with the MEM-P 902, SB 904, and AGP bus 921 and includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910 and further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 is a storage for storing image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

The engine controller 930 includes the scanner 931 and the printer 932. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls entire operation of the image forming apparatus 10a. For example, the controller 910 controls drawing, communication, or user inputs to the control panel 940. The scanner 931 or the printer 932 includes an image processing unit such as error diffusion processing and gamma conversion processing.

In response to an instruction to select a specific application through the control panel 940, for example, using a mode switch key, the image forming apparatus 10a selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile mode is selected.

The network I/F 950 controls communication of data with an external device through the communication network. The short-range communication circuit 920 and the network I/F 950 are electrically connected to the ASIC 906 through the PCI bus 922.

Figure 5A:
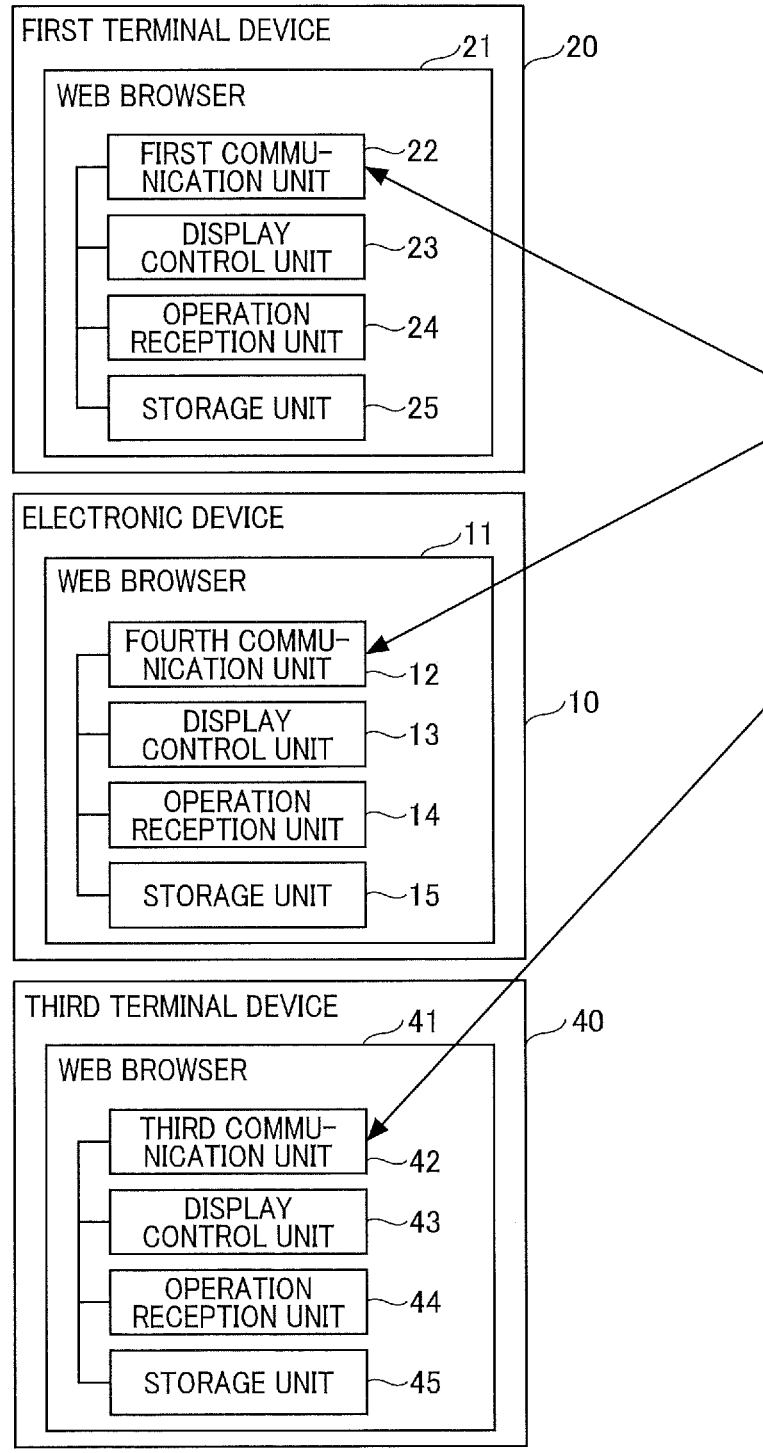
FIGS. 5A and 5B are block diagrams illustrating functions of a first terminal device, a third terminal device, an electronic device, and an information processing system.
Figure 5B:
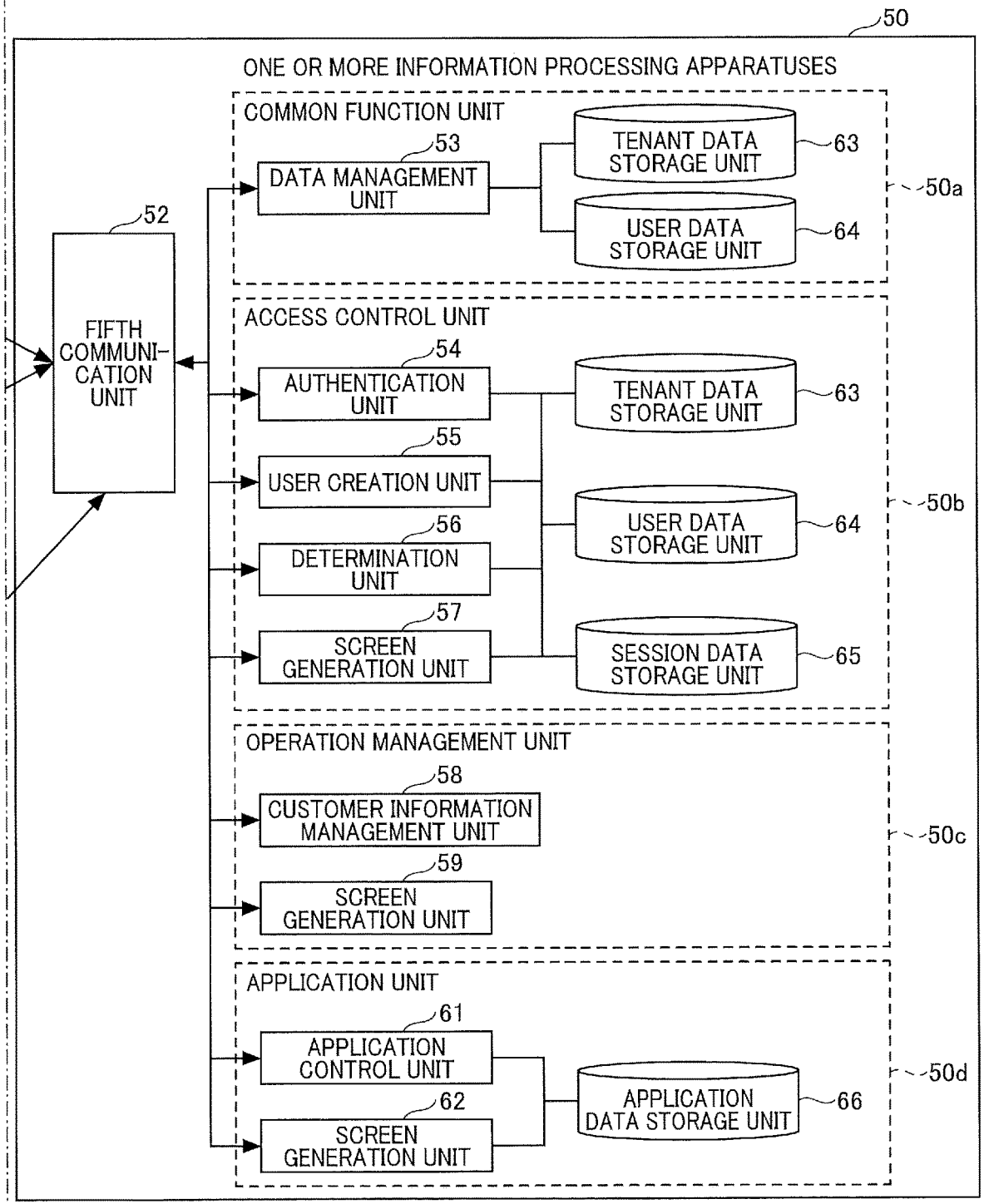

The function of each device of the service providing system 1 according to the present embodiment is implemented by, for example, a functional block illustrated in FIGS. 5A and 5B. FIGS. 5A and 5B are block diagrams illustrating functions of the first terminal device 20, the third terminal device 40, the electronic device 10, and an information processing system 50. Since the function of the second terminal device 30 is the same as the function of the first terminal device 20 or the third terminal device 40, description is omitted.

The first terminal device 20 includes a first communication unit 22, a display control unit 23, an operation reception unit 24, and a storage unit 25. The first terminal device 20 implements a functional block as illustrated in FIG. 5A by executing a program (for example, a web browser 21).

The first communication unit 22 communicates with the information processing system 50 to send and receive various information. For example, the screen information for display by the first terminal device 20 is received, and the information input to the screen by the tenant manager is transmitted to the information processing system 50.

The display control unit 23 analyzes the screen information of the screen received from the information processing system 50 and displays the screen on the display 506. The operation reception unit 24 receives the operation of the tenant manager for the first terminal device 20. The storage unit 25 is a memory by which the first terminal device 20 can store and acquire data. For example, a cookie or a local storage is recognized as a memory that can be accessed by the web browser 21.

The third terminal device 40 includes a third communication unit 42, a display control unit 43, an operation reception unit 44, and a storage unit 45. The third terminal device 40 implements a functional block as illustrated in FIG. 5A by executing a program (for example, a web browser 41).

The third communication unit 42 communicates with the information processing system 50 and receives screen information for the third terminal device 40 to display the login screen, the tenant management screen, the application setting screen, and the like, which are described below. In addition, the information input by the operator G on the login screen, the tenant management screen, and the application setting screen is transmitted to the information processing system 50.

The display control unit 43 analyzes the screen information of the screen received from the information processing system 50 and displays, for example, the login screen, the tenant management screen, the application setting screen, and the like on the display 506. The operation reception unit 34 receives the operation of the operator G with respect to the third terminal device 40. The storage unit 45 is a memory by which the third terminal device stores and acquires data. For example, the cookie and the local storage is recognized as the memory that can be accessed by a web browser 41.

The electronic device 10 includes a fourth communication unit 12, a display control unit 13, an operation reception unit 14, and a storage unit 15. The electronic device 10 implements a functional block as illustrated in FIG. 5A by executing a program (for example, a web browser 11).

The fourth communication unit 12 communicates with the information processing system 50 to receive screen information for the electronic device 10 to display a standby screen, a launcher screen, a login screen, an application screen, and the like. In addition, information input by the user on the standby screen, the launcher screen, the login screen, and the application screen is transmitted to the information processing system 50.

The display control unit 13 analyzes the screen information of the screen received from the information processing system 50 and displays, for example, the standby screen, the launcher screen, the login screen, and the application screen on the control panel 940. The operation reception unit 14 receives user operations on the electronic device 10 (for example, launching a launcher, inputting authentication information, selecting an application, operating an application, etc.). The storage unit 15 is a memory by which the electronic device 10 stores and acquires data. For example, the cookie and the local storage is recognized as the memory that can be accessed by a web browser 11.

The information processing system 50 includes a common function unit 50a, an access control unit 50b, an operation management unit 50c, and an application unit 50d. Each of the common function unit 50a, the access control unit 50b, the operation management unit 50c, and the application unit 50d communicates with the first terminal device 20, the third terminal device 40, or the electronic device 10 via the fifth communication unit 52. As described above, the configuration of the information processing system 50 is divided into four for the convenience of implementing the functions. Each of the common function unit 50a, the access control unit 50b, the operation management unit 50c, and the application unit 50d may be implemented by a separate information processing apparatus 49 or may be implemented by one information processing apparatus 49 as illustrated in FIG. 5B.

Each of these illustrated functions of the information processing system 50 is a function implemented by the CPU 501 of the computer 500 illustrated in FIG. 3 executing the program loaded from the RD 504 to the RAM 503. Further, a tenant data storage unit 63, a user data storage unit 64, a session data storage unit 65, and an application data storage unit 66 of the information processing system 50 are implemented in the RAM 503 from the HD 504 of the computer 500 illustrated in FIG. 3.

The common function unit 50a manages data that can be commonly used by the access control unit 50b, the operation management unit 50c, and the application unit 50d. The common function unit 50a has, for example, a data management unit 53, the tenant data storage unit 63, and the user data storage unit 64. The tenant data storage unit 63 and the user data storage unit 64 are described below. The data management unit 53 provides all or a part of the data stored in the storage units to the access control unit 50b, the operation management unit 50c, and the application unit 50d.

The access control unit 50b performs user authentication, management of various identifiers (IDs (identification information)), and access control of the user's tenant using these IDs. In addition, the users include the general user, the tenant manager, and the operator G.

The access control unit 50b includes an authentication unit 54, a user creation unit 55, a determination unit 56, and a screen generation unit 57. The authentication unit 54 authenticates the user with a user ID, a password, and the like. Authentication refers to determining whether or not the person who requested the authentication is a legitimate authority. In the present embodiment, authentication refers to whether or not the user has the authority to use the information processing system 50, and further, the role described below can be determined. Successful authentication refers to permitting the operator G, the user, or the tenant manager to log in to the information processing system 50. Login is an authentication act to access system resources using pre-registered account information when using various services on a computer or the internet. The account information is the user ID and the password, an IC card number, biometric authentication information, or the like.

The user creation unit 55 creates and deletes the virtual user V. The determination unit 56 makes various determinations, and determines, for example, whether or not to allow creation of the virtual user V. The screen generation unit 57 creates screen information of a web page to be displayed on the first terminal device 20, the third terminal device 40, or the electronic device 10.

The access control unit 50b includes the tenant data storage unit 63, the user data storage unit 64, and the session data storage unit 65. The tenant data storage unit 63 and the user data storage unit 64 are acquired from the common function unit 50a. The session data storage unit 65 is described below.

The operation management unit 50c provides a tool related to the operation performed by the operator G. The tool is a web page or web application operated by the operator G. The operation management unit 50c includes a customer information management unit 58 and a screen generation unit 59. The customer information management unit 58 acquires the information stored in the tenant data storage unit 63, the user data storage unit 64, and the session data storage unit 65 from the access control unit 50b. The screen generation unit 59 generates screen information for displaying the information acquired by the customer information management unit 58, similar to the screen generation unit 57 of the access control unit 50b. If there is information input to the screen, the customer information management unit 58 sends the input information to the access control unit 50b to update the data stored in the tenant data storage unit 63, the user data storage unit 64, and the session data storage unit 65.

The application unit 50d manages the applications used by the users belonging to the tenant and the tenant manager. The application unit 50d includes an application control unit 61 and a screen generation unit 62. The application control unit 61 provides the screen generation unit 62 with a list of applications for which the user belonging to the tenant has the usage authorization from the application data storage unit 66. In addition, the application selected by the user is acquired from the application data storage unit 66 to control the execution of the application. The screen generation unit 62 generates screen information of the application selection screen and the screen displayed by the application at the time of execution.

The application unit 50d includes an application data storage unit 66. The application data storage unit 66 is described below.

With reference to FIGS. 6A, 6B, 6C, 6D, and 6E, information stored in the tenant data storage unit 63, the user data storage unit 64, the session data storage unit 65, and the application data storage unit 66 is described.

FIG. 6A illustrates an example of tenant data stored in the tenant data storage unit 63. The tenant data includes a tenant name associated with a tenant ID, a parent tenant, and a proxy request. The tenant ID is identification information that identifies the tenant. The tenant name is a general name of the tenant. For example, a company name, a corporate name, or a brand name. The operator G first creates a tenant to which the customer belongs. This tenant is called a "child tenant" for distinction. On the other hand, the tenant to which the operator G who created the tenant belongs is called a "parent tenant". In FIG. 6A, the parent tenant of tenant A is Parent A, and the parent tenant of tenant B is Parent B. On the other hand, since Parent A and Parent B are tenants (Company A, Company B) to which the operator G belongs, parent tenant does not exist. Proxy request indicates whether or not the child tenant permits the operator G to manage the child tenant (application setting, etc.). Originally, the tenant manager sets the application in the tenant, but when the proxy request is "YES", the operator G can manage the child tenant on behalf of the tenant manager. Since there is no parent tenant for the parent tenant to which the operator G belongs, nothing is set in the proxy request.

FIG. 6B illustrates an example of user data stored in the user data storage unit 64. The user data includes the tenant ID, the role, and the virtual user V associated with the user ID. The tenant ID is the same as the tenant ID of the tenant data storage unit 63. The tenant ID indicates the tenant to which the user belongs. The user ID is the user identification information that uniquely identifies the user in the tenant. The role refers to a function and indicates the user's authority within the tenant. For example, the role includes Admin (tenant manager), User (general user), and so on. The role of virtual user V is Admin. This is because the virtual user V preferably has administrator authority because the virtual user V makes various settings for the tenant. The virtual user V indicates whether the user is a user belonging to the tenant or a temporary user registered by the operator G to manage the child tenant (to set the application, etc.). When the operator G temporarily belongs to the child tenant, the user is called a virtual user V In FIG. 6B, the users with user IDs a_virtual_001 and b_virtual_001 are virtual users V. The virtual user is a user that is valid only while the user of the parent tenant is logged in as the virtual user. The virtual user is deleted by logout.

FIG. 6C illustrates an example of session data stored in the session data storage unit 65. The session data includes the user ID associated with the session ID. The session ID is identification information for the information processing system 50 to identify a session. The session refers to a state in which communication has been established with the first terminal device 20, the second terminal device 30, the third terminal device 40, or the electronic device 10 used by a user, after the user (general user, tenant, operator G) logged in to the information processing system 50. The session ID is numbered following a successful authentication not to be duplicated. User ID is identification information of the user who started the session.

FIG. 6D illustrates an example of application data stored in the application data storage unit 66. The application data is a parameter set by each tenant for one application. The application data includes print settings and external storage associated with the tenant ID. This application prints a file acquired by the electronic device 10 from the external storage. Therefore, the print settings and the external storage can be set for each tenant. In the present embodiment, the virtual user V can set, for example, the print settings and the external storage on behalf of the user. The application data may be associated with the user ID (may be set for each user).

FIG. 6E illustrates terminal-side session data stored in the web browser executed by the third terminal device 40. As illustrated in FIG. 5, the web browser includes dedicated storage units 15, 25, and 45, which are, for example, the cookie or the local storage. The terminal-side session data is stored in the storage units 15, 25, and 45. The terminal-side session data includes the session ID associated with a session key. The session key is a name of session type, and from the session type, for example, which tenant the session is with can be known. The operator G may log in to the parent tenant or become the virtual user V of the child tenant, and the third terminal device 40 can transmit each session key to the information processing system 50. In FIG. 6E, the storage unit 45 of the web browser stores a plurality of session IDs, but only one session ID may be stored (the second and subsequent sessions may be overwritten).

With reference to FIG. 7, a creation of the virtual user V according to a request from the operator G is described. FIG. 7 is a sequence diagram illustrating an example of the login of operator G, the creation of virtual user V, and a process of setting an application or the like.

In step S1, the operator G operates the third terminal device 40 and inputs a login operation. The operator G inputs the user ID and password of the parent tenant to which the operator G belongs. The operation reception unit 44 of the third terminal device 40 receives the input. The third communication unit 42 of the third terminal device 40 designates the user ID and password and transmits the login request to the operation management unit 50c of the information processing system 50. The operator G instructs the third terminal device 40 to connect to the operation management unit 50c when performing daily operation. An example of the login screen is illustrated in FIG. 8.

In step S2, the operation management unit 50c receives the login request via the fifth communication unit 52. The operation management unit 50c transfers the login request to the access control unit 50b that performs authentication.

In step S3, the access control unit 50b receives the login request and the authentication unit 54 authenticates the operator G with the user ID and password. Here, it is assumed that the authentication is successful. In response to the successful authentication, the authentication unit 54 assigns a session ID to the communication established with the third terminal device 40 operated by the operator G. The authentication unit 54 stores the session ID and the user ID of the operator G in the session data storage unit 65. Then, the access control unit 50b transmits to the operation management unit 50c, a session ID relating to the parent tenant and a session key indicating that the session is between the parent tenant (indicates that the session was established by logging in to the parent tenant).

Further, the access control unit 50b transmits to the operation management unit 50c, a list of child tenants whose parent tenant is the tenant to which the operator G belongs. Therefore, the determination unit 56 of the access control unit 50b first identifies the tenant ID to which the operation management unit 50c belongs in the user data storage unit 64. Next, the tenant data storage unit 63 identifies the child tenant having the tenant ID of the operator G as the parent tenant. In addition, the determination unit 56 extracts the child tenants whose proxy request is "YES".

In step S4, the customer information management unit 58 of the operation management unit 50c receives the session ID and session key related to the parent tenant, and the list of child tenants. The screen generation unit 59 of the operation management unit 50c generates screen information of the tenant management screen that displays the list of child tenants. The operation management unit 50c transmits screen information of the tenant management screen, the session ID and the session key related to the parent tenant to the third terminal device 40.

Figure 9:
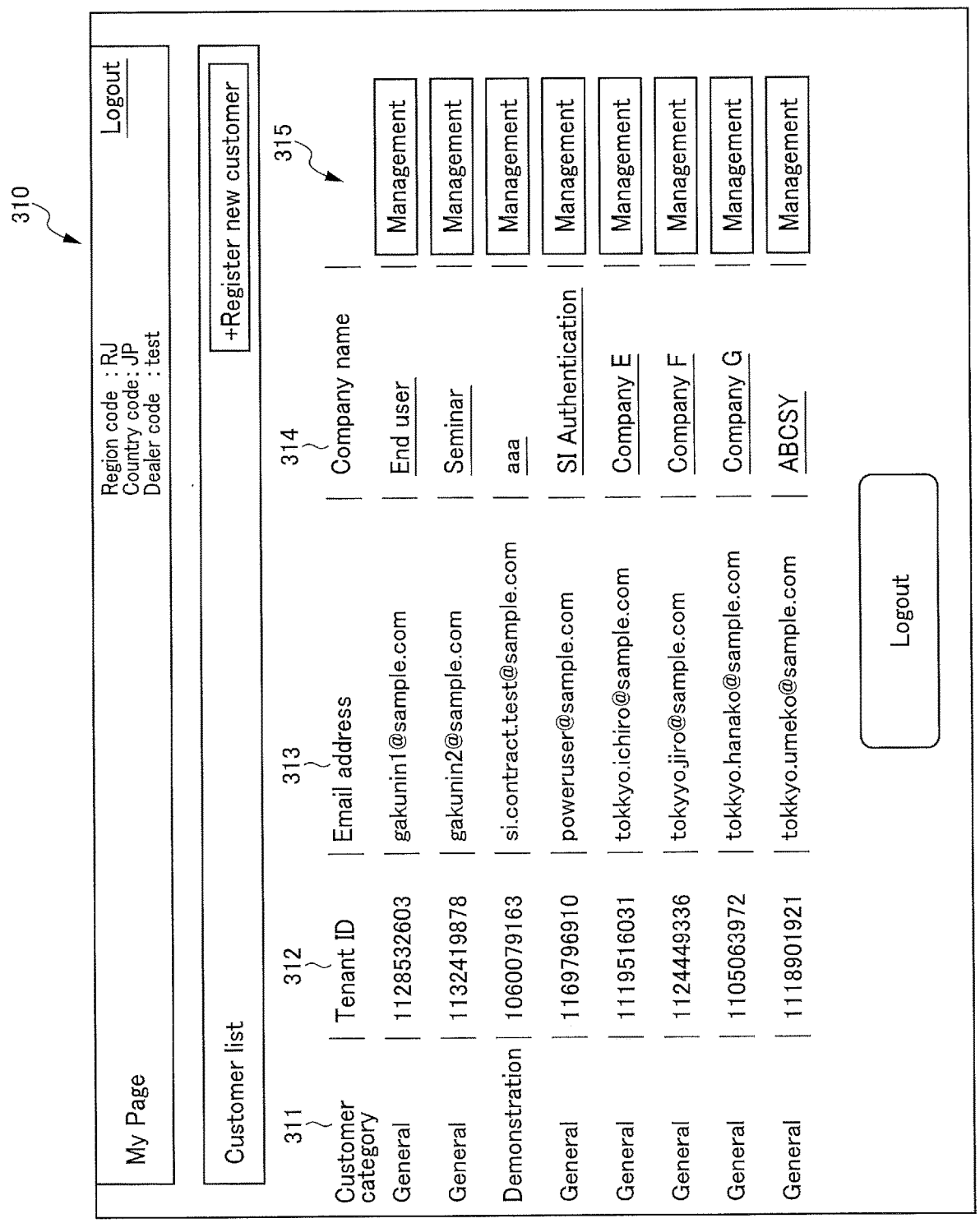
FIG. 9 is a diagram illustrating an example of a tenant management screen displayed by the third terminal device.

In step S5, the third communication unit 42 of the third terminal device 40 receives the screen information of the tenant management screen, the session ID related to the parent tenant, and the session key. The third communication unit 42 stores the session key and the session ID in the storage unit 45 of the web browser 41. In addition, the display control unit 43 displays the tenant management screen. An example of the tenant management screen is illustrated in FIG. 9.

The operator G selects a child tenant from the tenant management screen to make settings on behalf (performs an operation requesting management of the child tenant). That is, the operator G inputs an operation to create a virtual user of this child tenant. The operation reception unit 44 of the third terminal device 40 receives the selection. The third communication unit 42 transmits the tenant ID of the selected child tenant and the session ID (so that the information processing system can identify the session) regarding the parent tenant acquired from the storage unit 45 to the operation management unit 50c.

In step S6, the operation management unit 50c receives the tenant ID of the child tenant and the session ID related to the parent tenant. Since the tenant ID of the child tenant and the session ID related to the parent tenant are included in the virtual user creation request, the operation management unit 50c creates the virtual user V so that the operator G can manage the child tenant. The operation management unit 50c designates the tenant ID of the child tenant and the session ID related to the parent tenant, and requests the access control unit 50b to issue a session for communication with the virtual user V.

In step S7, the access control unit 50b receives a request to issue a session for communication with the virtual user V. The determination unit 56 determines whether the virtual user V is to be created for communication with the child tenant selected by the operator G. The details of this determination is described with reference to FIG. 11. Here, it is assumed that the determination unit 56 determines that the virtual user V is to be created for communication with the child tenant. When a virtual user V is created, it is considered that the virtual user V is logged in (otherwise the virtual user V cannot perform processing). Therefore, the user creation unit 55 generates a session ID for the virtual user V to communicate with the child tenant and the user ID of the virtual user and registers the session ID and the user ID in the session data storage unit 65 in association with each other. In addition, in each of the tenant ID, user ID, role, and virtual user of the user data storage unit 64, the tenant ID of the child tenant, the unique user ID indicating the virtual user, Admin, and the virtual user "YES", are stored respectively.

In step S8, the access control unit 50b transmits the session ID and session key related to the child tenant to the operation management unit 50c. This session key indicates the session for which the user (operator G) logs in to the child tenant. The customer information management unit 58 of the operation management unit 50c receives the session ID and session key related to the child tenant.

In step S9, the operation management unit 50c transmits the session ID and the session key related to the child tenant to the third terminal device 40 through the fifth communication unit 52. The third communication unit 42 of the third terminal device 40 receives the session ID and the session key related to the child tenant. The session key and the session ID are stored in the storage unit 45 of the web browser 41.

In step S10, the operator G inputs, for example, an operation for setting the application that can be used by the child tenant to the third terminal device 40. The operation reception unit 44 receives the input. The third communication unit 42 of the third terminal device 40 designates the session ID related to the child tenant and communicates with the application unit 50d. The third communication unit 42 cannot determine which of the session keys stored in the terminal-side session data of the storage unit 45 should be transmitted. Therefore, the third communication unit 42 transmits all the session keys and session IDs stored in the session data on the terminal side. If the session key and session ID are overwritten, only one needs to be transmitted.

In step S11, in order to verify the virtual user V, the application unit 50d designates the session ID related to the child tenant determined based on the session key and requests the access control unit 50*b* to verify the user.

In step S12, the access control unit 50*b* receives the user's verification request, and the authentication unit 54 searches the session data storage unit 65 for the session ID related to the child tenant. The session ID stored in the session data storage unit 65 indicates that the user has succeeded in authentication, so the authentication unit 54 transmits verification successful notification and user information to the application unit 50*d*. The user information is transmitted due to operational restrictions based on the user's role.

In step S13, the application unit 50*d* permits the operator G to manage (communicate) the child tenant as a virtual user by the verification successful notification. The application unit 50*d* receives the verification successful notification and the user information and transmits to the third terminal device 40 that the application setting of the child tenant is permitted.

Figure 10:
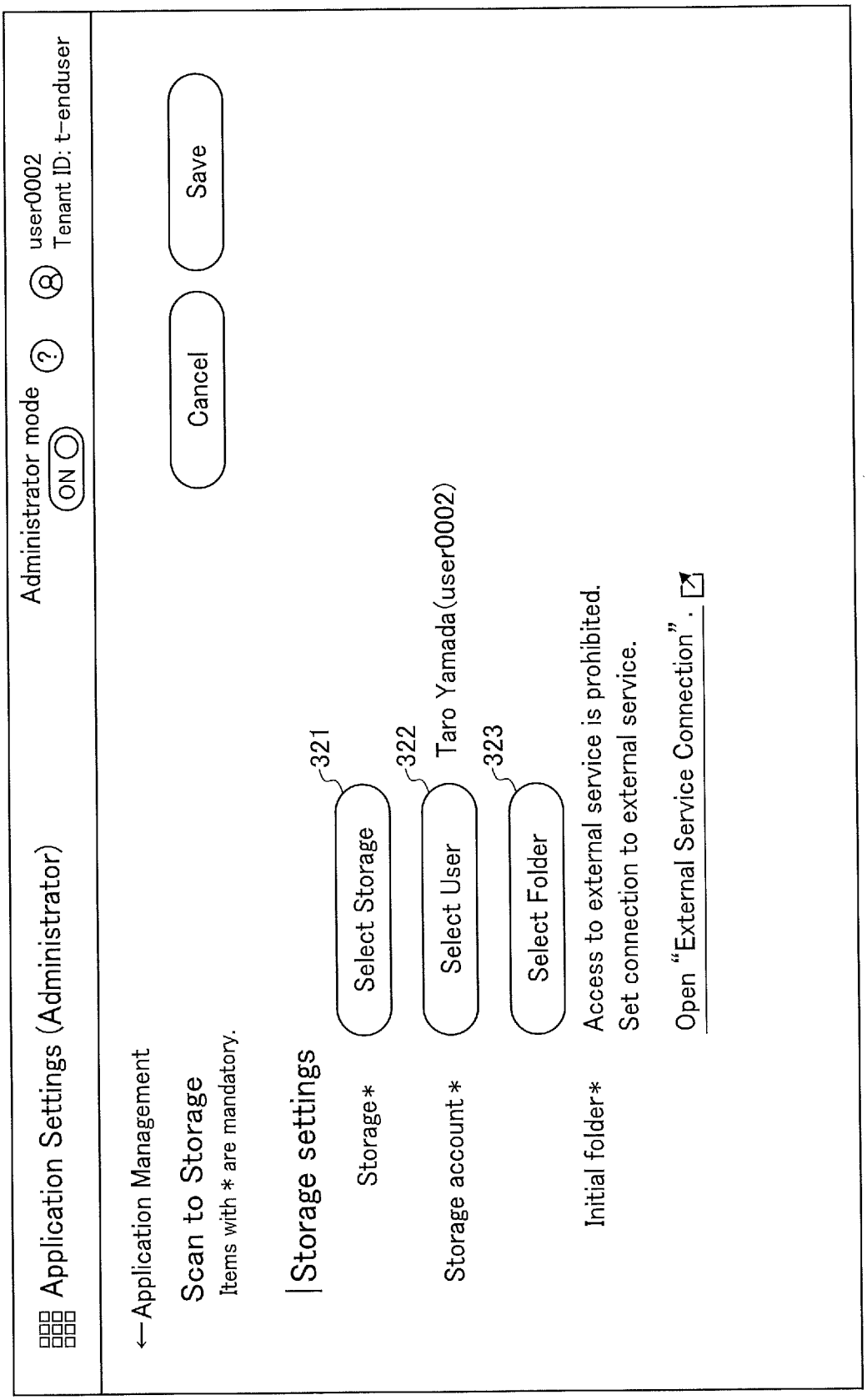
FIG. 10 is a diagram illustrating an example of an application setting screen.

In step S14, the operator G opens, for example, an application setting screen that can be used by the child tenant, and inputs the settings related to the application to the third terminal device 40. The operation reception unit 44 receives the input. The settings are transmitted to the application unit 50*d*. The application unit 50*d* receives the settings, and the application control unit 61 updates the settings related to the application of the application data storage unit 66. An example of the application setting screen is illustrated in FIG. 10.

As described above, when the information processing system 50 creates the virtual user V, the operator G can set the child tenant on behalf of the tenant manager.

FIG. 8 is a diagram illustrating an example of the login screen displayed by the third terminal device. The login screen 300 includes a tenant ID field 304, a user ID field 301, a password field 302, and a login button 303. The user enters the tenant ID in the tenant ID field, enters the user ID in the user ID field 301, and enters the password in the password field 302. The tenant ID, the user ID, and the password are examples of authentication information. When the user presses the login button 303, a login request is sent to the information processing system 50. The users can also log in with an email address and password. In this case, the tenant ID becomes unnecessary. This is because the tenant ID is unique only within the tenant, but the email address is unique regardless of the tenant.

FIG. 9 is a diagram illustrating an example of a tenant management screen 310 displayed by the third terminal device 40. The tenant management screen 310 displays the list of child tenants that can be set by the operator G. The tenant management screen 310 displays a customer category 311, the tenant ID 312, the email address 313, the company name 314, and a management button 315 for each tenant. For the customer category 311, there are general or demonstration. General indicates that the tenant has completed contracts, and demonstration indicates that the tenant is in free use before contract. The tenant ID 312 indicates the tenant ID of the child tenant. The email address 313 indicates the email address entered on the application screen by the user who requested for the provision of the service. Since an applicant of the provision of the service is basically the tenant manager, the email address is the email address of the tenant manager. The company name 314 indicates the tenant name of the tenant data storage unit 63. The management button 315 is a button for the operator G to manage the child tenant. The management button 315 also serves as a button to request the creation of a virtual user. When the management button 315 is pressed, the child tenant associated with the management button 315 becomes the child tenant selected in step S5 of FIG. 7.

FIG. 10 is a diagram illustrating an example of an application setting screen 320. The application setting screen 320 is for an application called "Scan to Storage". "Scan to Storage" is an application that saves image data scanned by the electronic device 10 in a storage.

The application setting screen 320 includes a storage selection field 321, a storage account field 322, and a folder selection field 323. The storage selection field 321 receives a selection such as the name of a commercial service that provides the storage service from the list. The storage account field 322 is an input field for a user's account for logging in to the storage. The account is, for example a user name, and identifies the user ID and password of the storage service associated with the user name. The folder selection field 323 receives a selection of the storage destination folder in the storage. The operator G can make such settings related to the application on behalf of the tenant manager of the child tenant.

Figure 11:
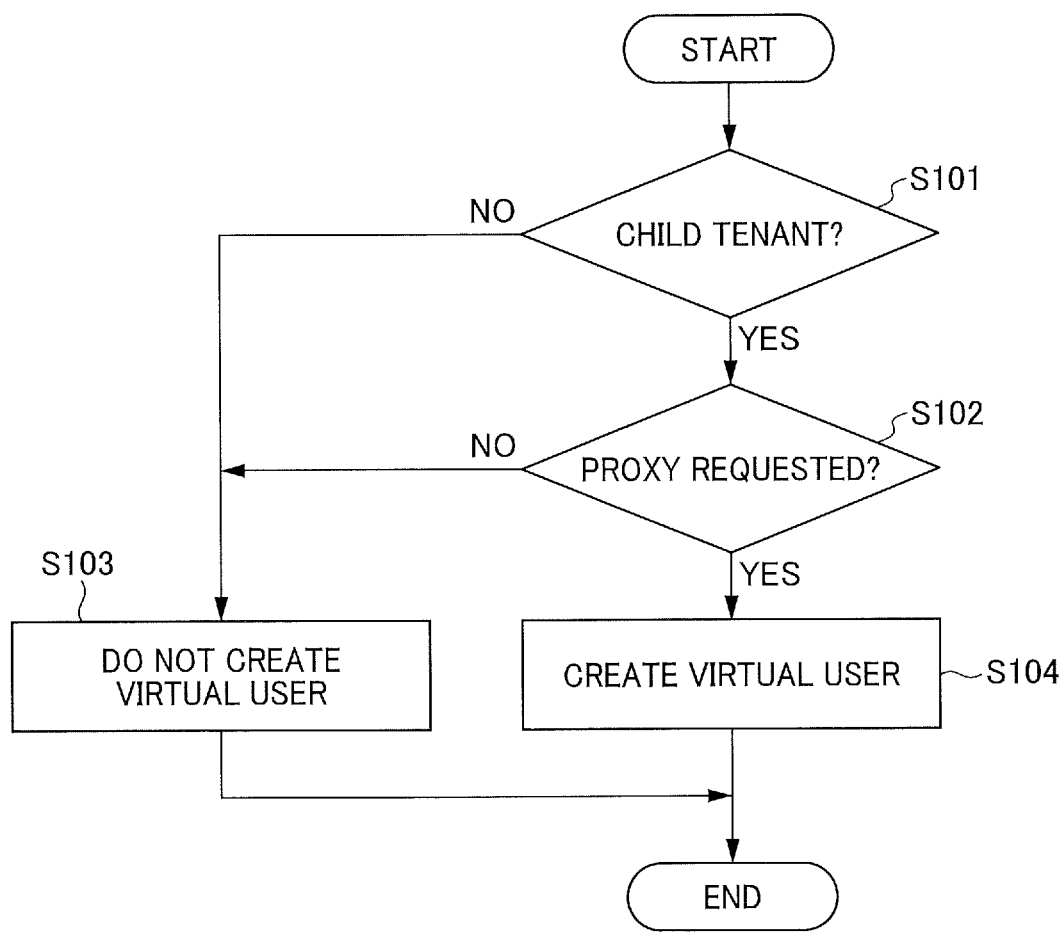
FIG. 11 is a flowchart illustrating an example of a process executed by a determination unit of an access control unit to determine whether to allow creation of a virtual user.

FIG. 11 is a flowchart illustrating an example of a process executed by the determination unit 56 of the access control unit 50*b* to determine whether to allow creation of the virtual user V. The process illustrated in FIG. 11 is executed in step S7 of FIG. 7.

In step S101, the determination unit 56 of the access control unit 50*b* determines whether or not the tenant ID of the child tenant selected by the operator G is a child tenant of the parent tenant to which the operator G belongs. The determination unit 56 searches the tenant ID of the child tenant in the tenant data storage unit 63 and identifies the tenant ID (referred to as A) registered as the parent tenant. Further, the determination unit 56 searches the session data storage unit 65 by the session ID related to the parent tenant, and acquires the user ID (user ID of the operator G) associated with this session ID. The determination unit 56 identifies the tenant ID (referred to as B) associated with this user ID with reference to the user data storage unit 64. Then, it is determined whether or not the tenant ID_A and the tenant ID_B match.

This determination indicates that the settings on behalf of the tenant manager can be performed only by the tenant created by the operator G. For example, it is possible to prevent a dealer Y from setting the child tenant created by a dealer X on behalf of the child tenant.

In step S102, the determination unit 56 determines whether or not "YES" is registered in the proxy request of the tenant data storage unit 63 with respect to the child tenant that has been confirmed to be a child tenant.

In step S104, if the determination in steps S101 and S102 are both Yes, the determination unit 56 determines that the creation of the virtual user V is permitted. In step S103, if the determination in any of steps S101 and S102 is No, the determination unit 56 determines that the virtual user V is not to be created.

The determination of steps S101 and S102 is also made in step S3 of FIG. 7, and the same determination is made twice including step S7. Therefore, for example, in step S3, the access control unit 50*b* may transmit a list of all child tenants without making the determination in steps S101 and S102. Alternatively, in step S3, the determination of steps S101 and S102 is performed, but a list of all child tenants is transmitted, and when the third terminal device 40 displays the tenant management screen 310, only the tenants determined to be YES in steps S101 and S102 may be displayed for selection (For example, the button managed by the tenant determined to be No in either step S101 or S102 is displayed in half brightness). As a result, the need to make the same decision twice in steps S3 and S7 can be reduced.

Since the virtual user V is not a real user, it is preferable to delete the virtual user V when it is no longer needed. In the present embodiment, the information of the virtual user V is deleted from the user data storage unit 64 by the logging out of the virtual user V.

Figure 12:
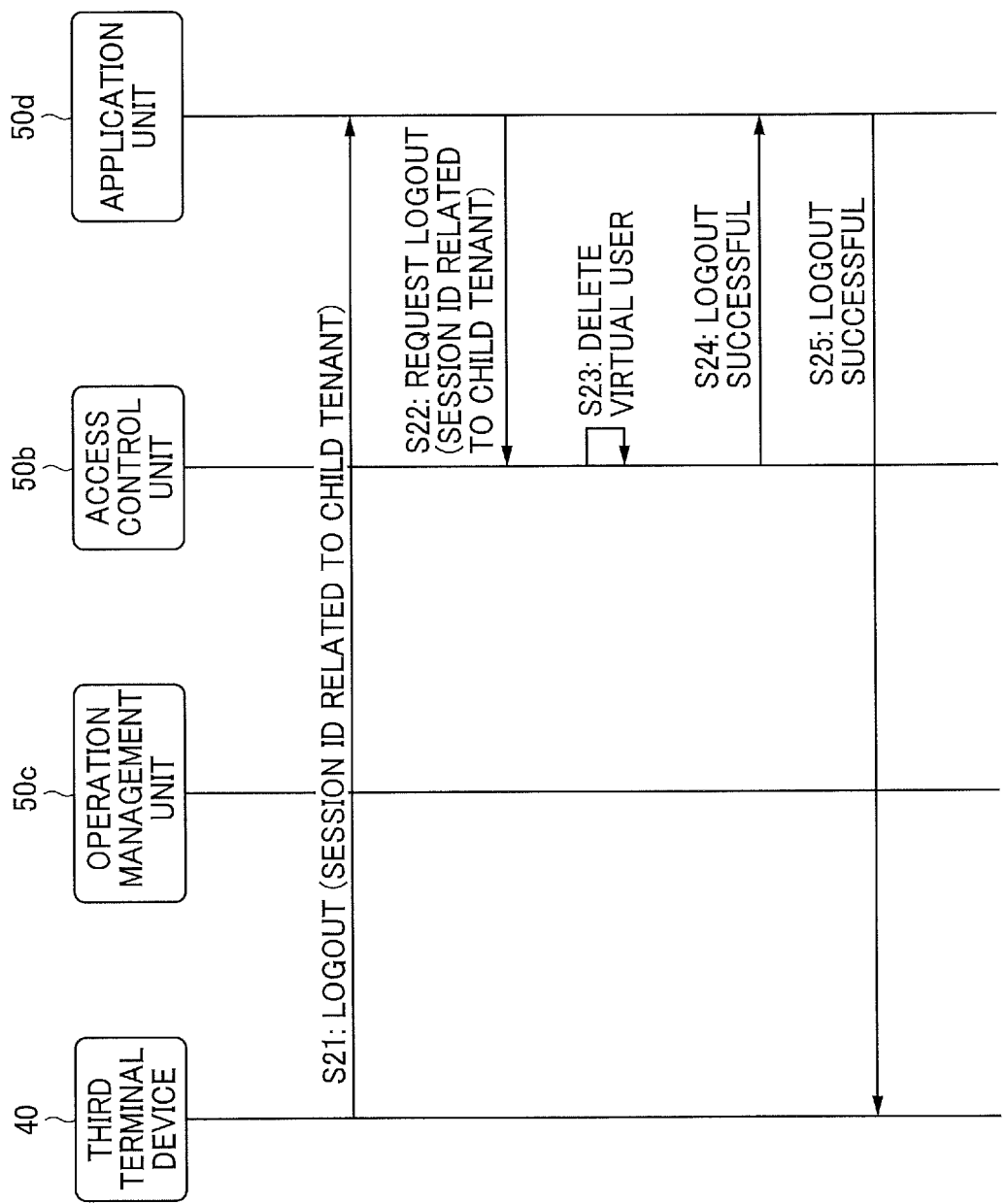
FIG. 12 is a sequence diagram illustrating an example of a procedure in which an access control unit deletes information related to a virtual user.

FIG. 12 is a sequence diagram illustrating an example of a procedure in which the access control unit 50b deletes information related to a virtual user V.

In step S21, a logout operation by the operator G is input to the third terminal device 40. The operation reception unit 44 of the third terminal device receives the logout. The third communication unit 42 designates all the session IDs and session keys of the session data on the terminal side and transmits the logout to the application unit 50d. The application unit 50d identifies the session ID related to the child tenant based on the session key.

In step S22, the application unit 50d receives the logout request and the session ID related to the child tenant. The application unit 50d designates the session ID related to the child tenant and requests the access control unit 50b to log out.

In step S23, the access control unit 50b receives the logout request, and the user creation unit 55 searches the session data storage unit 65 for the session ID related to the child tenant. When the session ID is stored in the session data storage unit 65, the associated user ID (user ID of the virtual user) is identified. The user creation unit 55 deletes the session ID and the user ID from the session data storage unit 65. Further, the user creation unit 55 deletes each item of the tenant ID, the role, and the virtual user V associated with the deleted user ID from the user data storage unit 64.

In step S24, the access control unit 50b transmits a logout successful notification to the application unit 50d.

In step S25, the application unit 50d transmits the logout successful notification to the third terminal device 40. As described above, the virtual user V is deleted from the user data storage unit 64, and the risk of a third party using the virtual user V to set the child tenant, or the like can be reduced.

As described above, in the service providing system 1 of the present embodiment, even if access control between tenants and applications are not supported by users of other tenants, users of the first tenant will be able to manage the second tenant.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, in the present embodiment, each terminal device uses a general-purpose web browser, but a dedicated application may be used for the information processing system.

Further, in the present embodiment, the operator creates the virtual user, but when the tenant manager or the general user requests the creation of the virtual user, the access control unit 50b may have a specific role that can create the virtual user.

Further, the configuration examples illustrated in FIGS. 5A, 5B, and the like are divided according to the main functions in order to facilitate the understanding of the processing by the first terminal device 20, the third terminal device 40, the electronic device 10, and the information processing system 50. The present disclosure is not limited by the way of dividing the processing unit or the name. The processing of the first terminal device 20, the third terminal device 40, the electronic device 10, and the information processing system 50 can be divided into more processing units according to the processing content. Further, one processing unit can be divided so as to include more processing.

The apparatuses described in the examples are merely an illustration of one of several computing environments for implementing the embodiments disclosed herein. In some embodiments, information processing system 50 includes multiple computing devices, such as a server cluster. The plurality of computing devices are configured to communicate with one another through any type of communication link, including a network, shared memory, etc., and perform the processes disclosed herein.

Further, the information processing system 50 may be configured to share the disclosed processing steps, for example, FIG. 7 in various combinations. For example, a process executed by a given unit may be executed by a plurality of information processing apparatuses included in the information processing system 50. Further, the information processing system 50 may be integrated into one server device or may be divided into a plurality of devices.

Each function of the embodiments described above can be implemented by one or a plurality of processing circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The invention claimed is:

1. An information processing system for providing a service to one or more users belonging to one or more tenants, the system comprising:
   circuitry configured to:
   create a second user belonging to a second tenant in response to reception of a request for managing the second tenant from a terminal device operated by a first user, the second tenant being different from a first tenant to which the first user belongs,
   determine whether a parent tenant of the second tenant and the first tenant to which the first user belongs match, in response to reception of a request for performing processing on behalf of the second tenant from the terminal device, and
   create the second user belonging to the second tenant in response to determining that the parent tenant of the second tenant and the first tenant to which the first user belongs match.

2. The information processing system of claim 1, wherein based on creation of the second user, the circuitry is further configured to allow the terminal device operated by the first user to communicate with the second tenant.

3. The information processing system of claim 1, wherein the circuitry is further configured to
   transmit to the terminal device, a list of child tenants having the first tenant as a parent tenant to which the first user belongs, based on tenant data associating a parent tenant and one or more child tenants created by the parent tenant, the list of child tenants to be displayed at the terminal device.

4. The information processing system of claim 3, wherein the tenant data indicates whether a child tenant allows processing to be performed by the parent tenant on behalf of the child tenant, and the list of child tenants transmitted to the terminal device includes the child tenants that are set to allow the processing to be performed on behalf of the child tenants.

5. The information processing system of claim 1, wherein when the parent tenant of the second tenant and the first tenant to which the first user belongs are determined to match, the circuitry is further configured to determine whether the second tenant is set to allow the processing to be performed on behalf of the child tenant based on the tenant data indicating whether to allow the processing to be performed on behalf of the child tenant and when the second tenant is determined to be set to allow the processing to be performed on behalf of the child tenant, the circuitry is further configured to create the second user belonging to the second tenant.

6. The information processing system of claim 1, wherein the second user is a virtual user that is valid only while the first user is logged in as the second user.

7. The information processing system of claim 6, wherein the second user is registered in a memory and in response to reception of a logout request of the second user from the terminal device, the circuitry is further configured to delete the second user from the memory.

8. A service providing system for providing a service to one or more users belonging to one or more tenants, comprising:
the information processing system of claim 1; and
the terminal device.

9. A user creation method performed by an information processing system for providing service to one or more users belonging to one or more tenants, the user creation method comprising:
creating a second user belonging to a second tenant, in response to reception of a request for managing the second tenant from a terminal device operated by a first user, the second user being different from a first tenant to which the first user belongs,
determining whether a parent tenant of the second tenant and the first tenant to which the first user belongs match, in response to reception of a request for performing processing on behalf of the second tenant from the terminal device, and
wherein the creating of the second user includes creating the second user belonging to the second tenant in response to determining that the parent tenant of the second tenant and the first tenant to which the first user belongs match.

* * * * *